United States Patent
Hinton et al.

(10) Patent No.: US 8,821,833 B2
(45) Date of Patent: Sep. 2, 2014

(54) WATER GAS SHIFT REACTION PROCESS

(75) Inventors: Graham Charles Hinton, Guisborough (GB); Richard Ian Johnston, Stockton on Tees (GB); John David Pach, Yarm (GB); Hsing-Chuan Yang, Blackburn (GB); Ian Richard Barton, Stockton on Tees (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/508,483

(22) PCT Filed: Oct. 14, 2010

(86) PCT No.: PCT/GB2010/051730
§ 371 (c)(1),
(2), (4) Date: May 7, 2012

(87) PCT Pub. No.: WO2011/055132
PCT Pub. Date: May 12, 2011

(65) Prior Publication Data
US 2012/0223274 A1    Sep. 6, 2012

(30) Foreign Application Priority Data

Nov. 5, 2009 (GB) .................................. 0919385.5

(51) Int. Cl.
*C01B 3/16* (2006.01)

(52) U.S. Cl.
USPC .......................................... 423/650; 252/373

(58) Field of Classification Search
None
See application file for complete search history.

(56) References Cited

U.S. PATENT DOCUMENTS

| | | | | |
|---|---|---|---|---|
| 3,595,619 A | * | 7/1971 | Slater et al. | 423/656 |
| 3,904,386 A | * | 9/1975 | Graboski et al. | 48/197 R |
| 4,141,191 A | * | 2/1979 | Aarons | 52/715 |
| 4,151,191 A | * | 4/1979 | Happel et al. | 518/714 |
| 4,161,393 A | * | 7/1979 | Rudolph et al. | 48/197 R |
| 5,152,975 A | | 10/1992 | Fong et al. | |
| 5,441,990 A | * | 8/1995 | Robin et al. | 518/703 |
| 5,656,566 A | * | 8/1997 | Ward | 502/316 |

FOREIGN PATENT DOCUMENTS

| | | |
|---|---|---|
| EP | 0062912 A1 | 10/1982 |
| EP | 1 690 826 A2 | 8/2006 |
| GB | 940960 | 11/1963 |
| GB | 1087987 | 10/1967 |
| GB | 1 213 343 | 11/1970 |

(Continued)

OTHER PUBLICATIONS

International Search Report dated Mar. 11, 2011, from PCT International Application No. PCT/GB2010/051730.

*Primary Examiner* — Melvin C Mayes
*Assistant Examiner* — Douglas Call
(74) *Attorney, Agent, or Firm* — RatnerPrestia

(57) ABSTRACT

A process for increasing the hydrogen content of a synthesis gas including hydrogen and carbon oxides and having a carbon monoxide content$\geq$45 mole % on a dry-gas basis, including the steps of:
  (i) combining the synthesis gas with steam to form a steam-enriched feed gas mixture
  (ii) passing the feed gas mixture at an inlet temperature in the range 220-370° C. over an iron-based water-gas shift catalyst to form a hydrogen-enriched shifted gas mixture having a carbon monoxide content$\leq$10 mole % on a dry gas basis, and
  (iii) recovering the hydrogen-enriched shifted gas mixture, where a portion of the hydrogen-enriched shifted gas mixture is recycled to the feed gas mixture.

15 Claims, 1 Drawing Sheet

(56) References Cited

FOREIGN PATENT DOCUMENTS

| | | |
|---|---|---|
| GB | 1 302 135 | 1/1973 |
| GB | 1400065 | 7/1975 |
| JP | S 34-413 | 2/1959 |
| JP | 49-053589 | 5/1974 |
| JP | 57-171438 A | 10/1982 |
| WO | WO-2009/078979 A2 | 6/2009 |
| WO | WO2010/013026 * | 2/2010 ................ B01J 8/02 |

* cited by examiner

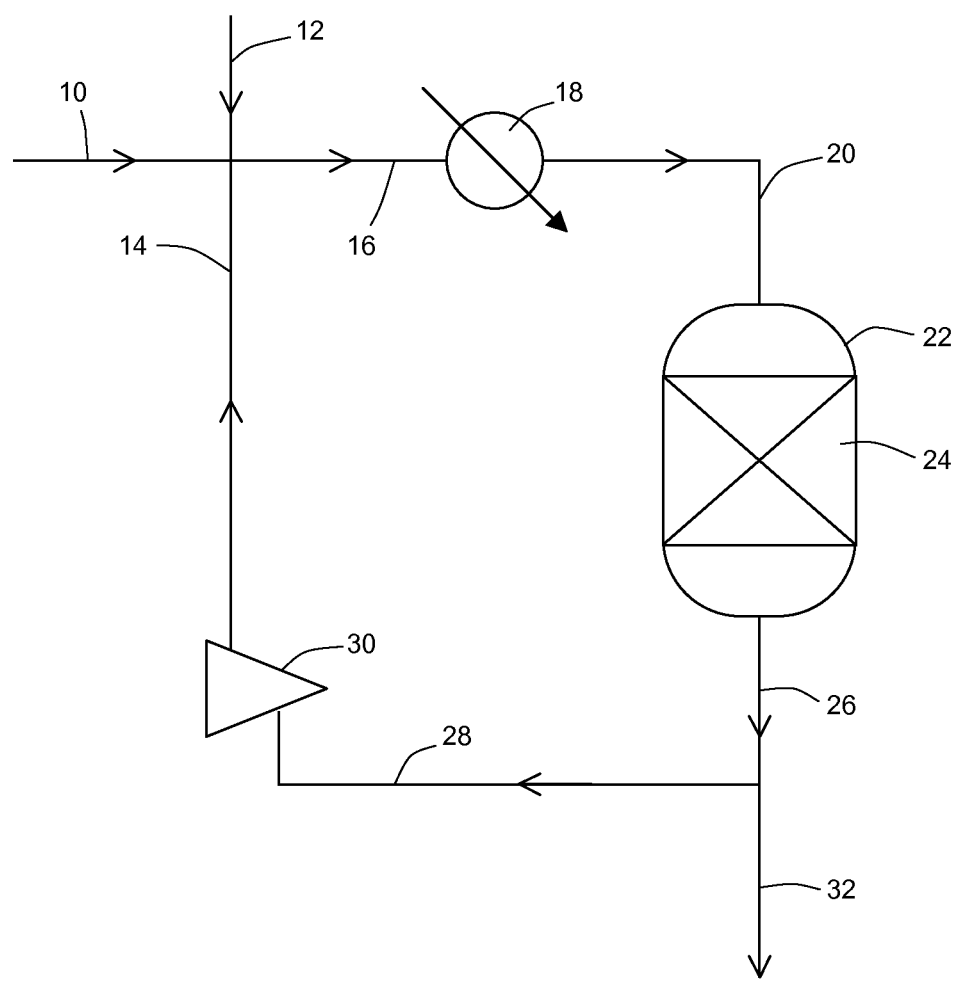

WATER GAS SHIFT REACTION PROCESS

CROSS-REFERENCE TO RELATED APPLICATIONS

This application is the U.S. National Phase application of PCT International Application No. PCT/GB2010/051730, filed Oct. 14, 2010, and claims priority of British Patent Application No. 0919385.5, filed Nov. 5, 2009, the disclosures of both of which are incorporated herein by reference in their entireties for all purposes.

FIELD OF THE INVENTION

This invention relates to water-gas shift processes.

BACKGROUND OF THE INVENTION

The water gas shift process is well established as a means to increase the hydrogen content and/or reduce the carbon monoxide content of synthesis gases produced by steam reforming, partial oxidation and gasification of hydrocarbon and carbonaceous feedstocks. The reaction may be depicted as follows.

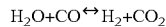

$$H_2O + CO \leftrightarrow H_2 + CO_2$$

The reaction is mildly exothermic and a favourable equilibrium is obtained at low temperatures. However it is often convenient to operate a single shift process at elevated temperatures to generate shifted gas mixtures with low CO contents (typically <10 mole % on a dry gas basis). To achieve acceptable conversion, iron-containing catalysts have found widespread use as so-called high-temperature-shift (HTS) catalysts. These catalysts are typically provided as a particulate fixed bed in axial or radial-flow shift converters that are operated at inlet temperatures above 340° C. in order to achieve an acceptable activity. Alternatively cobalt-molybdenum catalysts, which can be used in so-called "sour shift" processes, may be operated with inlet temperatures above 220° C.

A problem arises with synthesis gases derived from partial oxidation and in particular gasification of carbonaceous feedstocks. Such synthesis gases contain hydrogen, carbon oxides and a small amount of steam but have a relatively high carbon monoxide contents, typically ≥45 mole % CO on a dry gas basis. Such "reactive" synthesis gases can, as a result of the increased amount of shifting required to generate acceptably low CO-containing product gases, cause overheating and deterioration of the shift catalyst if operated conventionally.

GB1302135 describes a multi-stage shift process wherein a gaseous feed stream comprising CO and $H_2O$ is passed over a first catalyst bed of water-gas shift catalyst at 350-1050° F. and 1-250 atm to produce a partially shifted gas mixture, a portion of which is recycled to the feed stream and the remainder cooled and passed over a second water gas shift catalyst bed disposed in the same vessel. The complicated use of multiple beds with inter-bed cooling was performed to maximise conversion of conventional synthesis gas mixtures at low steam:dry gas ratios and is not suited to reactive synthesis gases.

U.S. Pat. No. 4,161,393 describes a multi-stage sour shift process wherein a raw gas produced by the gasification of a solid fuel is split; one portion is fed to a saturator where it is saturated with water vapour and fed to a shift vessel containing a sour shift catalyst at an inlet temperature in the range 280-450° C., to produce a shifted gas mixture which is combined with a further portion of the raw gas and fed to further shift vessels at an inlet temperature in the range 300-500° C. There is no recycle of the shifted gas mixture to the inlet of the shift vessels.

SUMMARY OF THE INVENTION

Accordingly the invention provides a process for increasing the hydrogen content of a synthesis gas comprising hydrogen and carbon oxides having a carbon monoxide content≥45 mole % on a dry-gas basis, comprising the steps of:
 (i) combining the synthesis gas with steam to form a steam-enriched feed gas mixture
 (ii) passing the feed gas mixture at an inlet temperature in the range 220-370° C. over a water-gas shift catalyst to form a hydrogen-enriched shifted gas mixture having a carbon monoxide content≤10 mole % on a dry gas basis, and
 (iii) recovering the hydrogen-enriched shifted gas mixture, wherein a portion of the hydrogen-enriched shifted gas mixture is recycled to the feed gas mixture.

BRIEF DESCRIPTION OF THE DRAWING

The invention will also be described by reference to FIG. 1, which depicts a flowsheet of one embodiment of the present invention.

In FIG. 1 a synthesis gas stream 10 comprising hydrogen and carbon oxides and having a carbon monoxide content≥55 mole % on a dry-gas basis, is mixed with a steam stream 12 and a compressed recycle stream 14 to form a steam-enriched feed gas mixture 16 which is heated in heat exchanger 18 to a temperature in the range 300-360° C. and then fed via line 20 to the inlet of a shift converter 22 containing a fixed bed 24 of a particulate iron-containing water-gas shift catalyst. The water gas shift reaction occurs adiabatically over the catalyst 24 in the shift converter 22 thereby increasing the hydrogen content of the gas mixture and reducing the carbon monoxide content to ≤10 mole % on a dry gas basis. The product hydrogen-enriched shifted gas mixture is recovered from the converter 22 via line 26. A portion of the product gas mixture is taken from line 26 via line 28 for recycle. The recycle stream is compressed in compressor 30 from which line 14 conveys the compressed recycle stream to form the feed gas mixture. The non-recycle product stream is recovered from line 26 via line 32.

DETAILED DESCRIPTION OF THE INVENTION

By "dry gas basis" we mean the composition of the gas mixture disregarding the steam content. It will be understood that the synthesis gas, which may also be termed "dry gas" may contain relatively small amounts of steam.

By recycling the shifted gas containing only a small amount of CO to the inlet, the process may be operated adiabatically at a suitably high inlet temperature, without the exotherm from the high CO in the synthesis gas feed causing deterioration of the shift catalyst towards the exit of the shift converter. The process of the aforesaid GB1302135 was exemplified with a synthesis gas feed having 48.71% volume CO on a dry gas basis and because the conversions over the first shift catalyst were incomplete, the CO contents of the recycled gases were >10 mole %. Accordingly GB1302135 does not consider the problem of using a high $CO_2$-containing recycle stream to moderate the temperature through a single bed of high temperature shift catalyst fed with a reactive synthesis gas.

The synthesis gas in the present invention may be any synthesis gas having a CO content≥45 mole % on a dry-gas basis, preferably ≥55 mole % on a dry-gas basis, but is preferably one derived from the gasification of coal, petroleum coke or biomass. In particular, the synthesis gas preferably has a carbon monoxide content≥60 mole % on a dry-gas basis.

The synthesis gas requires sufficient steam to allow the water-gas shift reaction to proceed. Whereas synthesis gases derived from processes such as steam reforming may contain sufficient steam, reactive synthesis gases generally are deficient in steam and steam must be added. The steam may be added by direct injection or by another means such as a saturator or steam stripper. In the present invention, because steam is present in the recycled shifted gas mixture the amount of fresh steam required is reduced over a non-recycle process. Reducing steam generation is clearly economically advantageous. The amount of steam should desirably be controlled such that the total steam:synthesis gas volume ratio in the steam-enriched synthesis gas mixture fed to the catalyst, including the steam from the recycle stream, is in the range 0.5:1 to 4:1, preferably in the range 1:1 to 2.5:1.

The inlet temperature of the shift process may be in the range 220-370° C., but is preferably in the range 240-350° C. For high temperature shift catalysts, the inlet temperature is preferably in the range 300-360° C. and more preferably 310-330° C. so that the performance of the catalyst over an extended period is maximised. The shift process is preferably operated adiabatically without cooling of the catalyst bed, although if desired some cooling may be applied for example by passing cooling water under pressure through tubes disposed in the catalyst bed. The exit temperature from the shift vessel is preferably ≤500° C., more preferably ≤475° C. to maximise the life and performance of the catalyst.

The process is preferably operated at elevated pressure in the range 1-100 bar abs, more preferably 15-50 bar abs.

Any suitable water-gas shift catalyst that is suitably active at the inlet temperature may be used. In one embodiment, the water gas shift is a high-temperature shift catalyst comprising one or more iron oxides stabilised with chromia and/or alumina and which may optionally contain zinc oxide and one or more copper compounds.

Traditional chromia-promoted magnetite catalysts may be used. Iron oxide/chromia shift catalysts are conventionally made by precipitation of iron and chromium compounds (that decompose to the oxides upon heating) from a solution of iron and chromium salts by the addition of a suitable alkaline reactant, e.g. sodium hydroxide or carbonate. The resulting precipitate is then washed, dried, and calcined and tabletted to form catalyst precursor pellets. The precursor preferably has an iron oxide content (expressed as $Fe_2O_3$) of 60 to 95% by weight. Preferably the iron to chromium atomic ratio in the precursor is in the range 6 to 20, particularly 8 to 12. The precursor may contain oxides of other metals, e.g. aluminium, manganese, or, especially, copper. Particularly preferred precursors have an iron to copper atomic ratio of 10:1 to 100:1. Prior to use for the shift reaction, the pellets are subjected to reduction conditions wherein the iron oxide is reduced to magnetite ($Fe_3O_4$) and any chromium trioxide present reduced to the sesquioxide, chromia ($Cr_2O_3$). This reduction is often carried out in the reactor wherein the shift reaction is to be effected. We have found that the activity of the catalyst may be significantly increased by incorporating into the catalyst precursor particles of aspect ratio of at least 2 and a maximum dimension of at least 5000 Å (500 nm), and preferably less than 15000 Å (1500 nm) into the catalyst precursor pellets. Preferably the chromia-promoted magnetite catalyst comprises acicular iron oxide particles. Such catalysts are described in U.S. Pat. No. 5,656,566. A particularly suitable commercially available high temperature water gas shift catalyst is KATALCO$_{JM}$™ 71-5 available from Johnson Matthey PLC.

Alternatively, it may be desirable to at least part replace the chromia with alumina or another stabilising oxide. Zinc oxide and copper may desirably also be present. Such catalysts are described for example in WO2009078979.

In another embodiment, the water gas shift catalyst is a sour shift catalyst comprising 1-5% wt cobalt and 5-15% molybdenum, optionally with additional oxides such as magnesia and/or titanium dioxide, on a suitable support such as alumina or calcium aluminate. Such catalysts are often made by impregnating an oxidic support composition with cobalt and molybdenum compounds and heating the resulting composition to convert the cobalt and molybdenum compounds to their respective oxides. In use, or before use if desired, the cobalt and molybdenum oxides may be sulphided with a suitable sulphur compound such as hydrogen sulphide. Such catalysts are described for example in GB 1087987, GB1213343 and GB940960. A particularly suitable commercially available sour shift catalyst is KATALCO$_{JM}$™ K8-11 available from Johnson Matthey PLC.

The water-gas shift reaction converts the majority of the CO in the feed gas to $CO_2$ such that the product gas mixture has a CO content≤10% by volume on a dry gas basis. Preferably the temperature, pressure and flowrates are set such that the hydrogen-enriched shifted gas mixture has a carbon monoxide content≤7.5% by volume on a dry gas basis.

In the present invention, it is a portion of the product gas stream containing a low level of CO that is recycled. 20 to 80% by volume, preferably 30 to 45% by volume of the hydrogen-enriched shifted gas mixture, is recycled to the feed gas mixture. The recycle may be controlled by conventional valve means. In a preferred embodiment, the recycle stream is fed through an injector.

The synthesis gas, fresh steam and recycle stream may be combined in any order to form the mixed gas feed. For example, the recycle stream may be mixed with steam in an injector and the mixed recycle stream/steam mixture combined with the synthesis gas to form the mixed feed stream.

The product gas stream that is not recycled may be used in conventional downstream processes. Where the water gas shift catalyst is a sour shift catalyst, the product gas stream may be fed, optionally with a part of the synthesis gas, to one or more further sour shift vessels containing a sour shift catalyst, for example as described in the aforesaid U.S. Pat. No. 4,161,393. Similarly, where the water gas shift catalyst is a high temperature shift catalyst, the product gas stream may be subjected to one or more further shift stages, such as medium temperature shift and/or low-temperature shift over one or more copper catalysts in separate vessels, but generally this is not required. Hence, the hydrogen enriched shifted gas, without further shifting, may be cooled to a temperature below the dew point so that the steam condenses. The dewatered shifted gas mixture may be fed to methanol, dimethyl ether, Fischer-Tropsch wax, olefin and other chemical syntheses processes or may be subjected to a stage of $CO_2$-removal to generate hydrogen for ammonia synthesis or the generation of electrical power as part of an IGCC process.

EXAMPLES

The invention is further illustrated by reference to the following calculated Example in accordance with the embodiment depicted in FIG. 1.

Example 1

Catalyst: KATALCO JM 71-5
Catalyst Volume: about 47 m³
Inlet Temperature: 320° C.
Inlet pressure: 23 bar g
Fresh steam:dry gas ratio 1.5:1
Total steam:dry gas ratio: 2.0:1

| | Stream | | | |
|---|---|---|---|---|
| | 10 | 12 | 14 | 16 |
| Vapour Fraction | 1.00 | 0.00 | 1.00 | 0.61 |
| Temperature [° C.] | 43.00 | 43.00 | 469.27 | 150.96 |
| Pressure [MPa] | 2.40 | 2.40 | 2.40 | 2.40 |
| Molar Flow [Nm³/h(gas)] | 85000 | 127500 | 114749 | 327248 |
| Mass Flow [kg/h] | 81769 | 102477 | 99493 | 283739 |
| Liquid Volume Flow [m³/h] | 128.22 | 102.68 | 155.97 | 386.88 |
| Heat Flow [kW] | −76690 | −448849 | −237963 | −763503 |
| Component | Mole Fraction | | | |
| $H_2$ | 0.250000 | 0.000000 | 0.310066 | 0.173659 |
| $CO_2$ | 0.010000 | 0.000000 | 0.214076 | 0.077662 |
| CO | 0.620000 | 0.000000 | 0.037921 | 0.174337 |
| $H_2O$ | 0.000000 | 1.000000 | 0.389931 | 0.526340 |
| Methane | 0.010000 | 0.000000 | 0.004000 | 0.004000 |
| Nitrogen | 0.100000 | 0.000000 | 0.040000 | 0.040000 |
| Air | 0.010000 | 0.000000 | 0.004000 | 0.004000 |
| Methanol | 0.000000 | 0.000000 | 0.000006 | 0.000002 |

| | Stream | | | |
|---|---|---|---|---|
| | 20 | 26 | 28 | 32 |
| Vapour Fraction | 1.00 | 1.00 | 1.00 | 1.00 |
| Temperature [° C.] | 320.00 | 464.29 | 464.29 | 464.29 |
| Pressure [MPa] | 2.40 | 2.35 | 2.35 | 2.35 |
| Molar Flow [Nm³/h(gas)] | 327248 | 327246 | 114749 | 212497 |
| Mass Flow [kg/h] | 283739 | 283738 | 99493 | 184246 |
| Liquid Volume Flow [m³/h] | 386.88 | 444.82 | 155.97 | 288.84 |
| Heat Flow [kW] | −679392 | −679392 | −238228 | −441164 |
| Component | Mole Fraction | | | |
| $H_2$ | 0.173659 | 0.310071 | 0.310071 | 0.310071 |
| $CO_2$ | 0.077662 | 0.214081 | 0.214081 | 0.214081 |
| CO | 0.174337 | 0.037916 | 0.037916 | 0.037916 |
| $H_2O$ | 0.526340 | 0.389926 | 0.389926 | 0.389926 |
| Methane | 0.004000 | 0.004000 | 0.004000 | 0.004000 |
| Nitrogen | 0.040000 | 0.040000 | 0.040000 | 0.040000 |
| Air | 0.004000 | 0.004000 | 0.004000 | 0.004000 |
| Methanol | 0.000002 | 0.000006 | 0.000006 | 0.000006 |

Recycle:product flow mole ratio: 0.54 (35% of HTS outlet flow)
CO slip in product gas mixture: 6.2 mole % on dry gas basis (3.8 mole % on wet gas basis).
CO molar conversion (on wet gas): 93.9%

In the above model, the steam stream 12 is liquid (and the mixed stream 16 partially liquid) in order to simplify its combination with the synthesis gas and recycle stream and allow a single heat exchanger to bring the feed mixture to the inlet temperature. It will be understood that variation in the flowsheet in order to efficiently combine gaseous steam, recycle stream and synthesis gas (dry gas) stream may be performed by the skilled person using conventional techniques and are within the scope of the present invention.

The model shows that the exotherm across the catalyst is controlled to <470° C. using the recycle of $H_2/CO_2$-rich product gas. The catalyst is predicted to remain effective under these conditions for 3 or more years, while without a product gas recycle, the exotherm would cause rapid deactivation of the catalyst. Furthermore, the methane, air, nitrogen and methanol contents of the synthesis gas do not materially affect the performance of the catalyst under the conditions. Catalyst over-reduction is also not expected to occur under these conditions.

The invention claimed is:

1. A process for increasing the hydrogen content of a synthesis gas derived from the gasification of coal, petroleum coke or biomass, said synthesis gas comprising hydrogen and carbon oxides and having a carbon monoxide content≥45 mole % on a dry-gas basis, comprising the steps of:
   (i) combining the synthesis gas with steam to form a steam-enriched feed gas mixture
   (ii) supplying the feed gas mixture at an inlet temperature in the range 220-370° C. to a shift vessel comprising a bed of water-gas shift catalyst and passing the feed gas mixture over the water-gas shift catalyst disposed in the shift vessel to form a hydrogen-enriched shifted gas mixture containing steam at an outlet temperature greater than the inlet temperature by an exothermic water-gas shift reaction, the hydrogen-enriched shifted gas mixture containing steam having a carbon monoxide content≤10 mole % on a dry gas basis, and
   (iii) recovering the hydrogen-enriched shifted gas mixture containing steam leaving the bed of water-gas shift catalyst from the shift vessel at an exit temperature≤475° C.,
   wherein 20 to 80% by volume, of the hydrogen-enriched shifted gas mixture containing steam leaving the bed of water-gas shift catalyst is recycled to the feed gas mixture to control the temperature rise across the water-gas shift catalyst from the shift vessel,
   wherein
   the hydrogen-enriched shifted gas mixture containing steam that is not recycled is subjected, without further shifting, to cooling to remove the steam and then downstream processing.

2. A process according to claim 1 wherein the carbon monoxide content of the synthesis gas is ≥55 mole % on a dry-gas basis.

3. A process according to claim 1 wherein the total steam: synthesis gas volume ratio in the steam-enriched feed gas mixture, including the recycle stream, is in the range 0.5:1 to 4:1.

4. A process according to claim 1 wherein the inlet temperature is in the range 240-350° C.

5. A process according to claim 1 wherein the water gas shift catalyst comprises one or more iron oxides stabilized with chromia and/or alumina.

6. A process according to claim 5 wherein the water gas shift catalyst is a chromia-promoted magnetite catalyst containing acicular iron oxide particles.

7. A process according to claim 1 wherein the water gas shift catalyst comprises cobalt and molybdenum in oxidic or sulphided form on oxidic support composition.

8. A process according to claim 7 wherein the water gas shift catalyst comprises 1-5% wt cobalt and 5-15% molybdenum, magnesia and an alumina support.

9. A process according to claim 1 wherein 30 to 45% by volume of the hydrogen-enriched shifted gas mixture containing steam is recycled to the feed gas mixture.

10. A process according to claim 1 wherein the recycle stream is fed through an injector.

11. A process according to claim 1 wherein the carbon monoxide content of the synthesis gas is ≥60 mole % on a dry-gas basis.

12. A process according to claim 1 wherein the total steam: synthesis gas volume ratio in the steam-enriched feed gas mixture, including the recycle stream, is in the range 1:1 to 2.5:1.

13. A process according to claim 1 wherein the inlet temperature is in the range 300-360° C.

14. A process according to claim 1 wherein the inlet temperature is in the range 310-330° C.

15. A process according claim 1 wherein the water gas shift catalyst comprises one or more iron oxides stabilised with chromia and/or alumina and also contains zinc oxide and one or more copper compounds.

* * * * *